Figure 1:
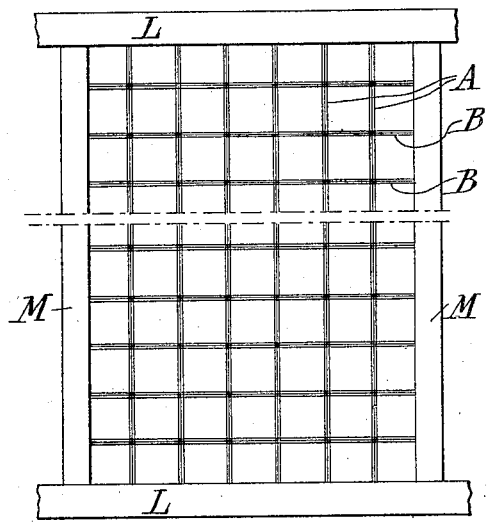

No. 820,461. PATENTED MAY 15, 1906.
W. N. WIGHT.
BUILDING CONSTRUCTION AND THE LIKE.
APPLICATION FILED APR. 11, 1903.

4 SHEETS—SHEET 1.

WITNESSES:
Fred White
Domingo A. Maina

INVENTOR:
William N. Wight,
By Attorneys,

No. 820,461. PATENTED MAY 15, 1906.
W. N. WIGHT.
BUILDING CONSTRUCTION AND THE LIKE.
APPLICATION FILED APR. 11, 1903.

4 SHEETS—SHEET 2.

WITNESSES:
Fred White
Domingo A. Usana

INVENTOR:
William N. Wight.
By Attorneys,
Arthur C. Fraser

No. 820,461. PATENTED MAY 15, 1906.
W. N. WIGHT.
BUILDING CONSTRUCTION AND THE LIKE.
APPLICATION FILED APR. 11, 1903.

4 SHEETS—SHEET 3.

WITNESSES:
Fred White
Domingo A. Usina

INVENTOR:
William N. Wight,
By Attorneys,

No. 820,461. PATENTED MAY 15, 1906.
W. N. WIGHT.
BUILDING CONSTRUCTION AND THE LIKE.
APPLICATION FILED APR. 11, 1903.
4 SHEETS—SHEET 4.
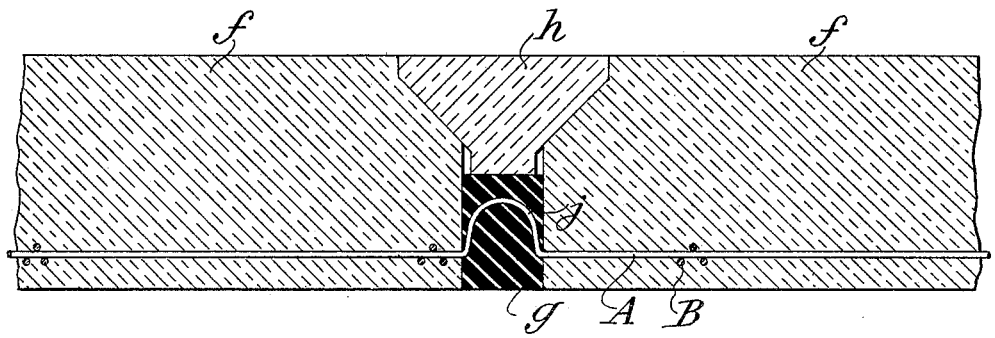
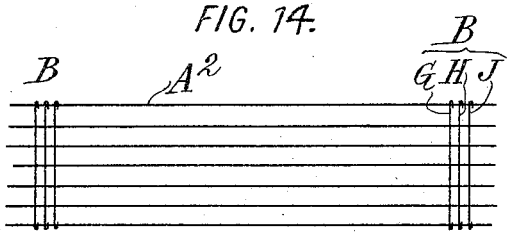
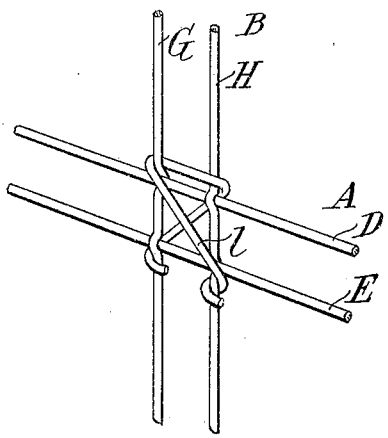
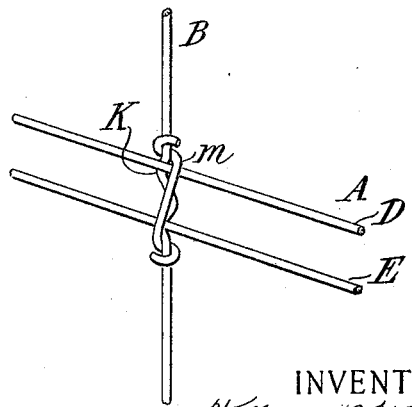
WITNESSES:
INVENTOR:
William N. Wight,
By Attorneys,

UNITED STATES PATENT OFFICE.

WILLIAM N. WIGHT, OF NEW YORK, N. Y.

BUILDING CONSTRUCTION AND THE LIKE.

No. 820,461.　　　　　Specification of Letters Patent.　　　　Patented May 15, 1906.

Application filed April 11, 1903. Serial No. 152,142.

*To all whom it may concern:*

Be it known that I, WILLIAM N. WIGHT, a citizen of the United States, residing in the borough of Manhattan, city, county, and State of New York, have invented certain new and useful Improvements in Building Construction and the Like, of which the following is a specification.

My invention aims to provide certain improvements in building construction based on the use of a wire fabric having features which render it peculiarly adapted for the purposes described.

A great number of forms which the fabric may take according to the broad invention are illustrated in detail in my application, Serial No. 146,904, filed March 9, 1903.

The fabric may be briefly described as composed of strands which comprise each a plurality of wires arranged comparatively close together. For the general purposes of the broad invention described in said application the spacing of the wires composing the separate strands and also the spacing of the complete strands relatively to each other may be very varied, depending on the use to which the fabric is to be put. For most purposes in connection with building construction I prefer that each of the strands throughout the fabric shall be made of a plurality of wires, thus contributing flexibility in all directions. In the application of the fabric to the reinforcement of concrete the individual wires of a single strand should for the best results be straight (at least between the crossing-points) parallel to each other and lying in a single plane and should be spaced apart sufficiently to permit the passage of the concrete between them and to permit a sufficient thickness of concrete between them to neutralize the effect of the break in the continuity of the concrete along each wire. The use of straight wires avoids the twisting or stretching experienced in fabrics having a strand composed of wires twisted together like a rope, and preferably one set of strands is composed of wires straight throughout their length. Where the strands or wires of one set are straight throughout their length, it is preferable to lay such wires transversely of the supports, so that they will carry the strain directly to the supports without any liability of stretching or of damaging the concrete, as might be the case with a kinked wire. This, however, is not an essential feature.

The fineness of the wires and consequent thinness of the fabric in comparison with the total strength of the fabric is of great advantage in concrete structures, because it minimizes the weakening of the concrete along the lines of the wires and makes the entire fabric very flexible, so that its manipulation in manufacture and in use is extremely easy, and above all it has the great advantage over a fabric made of single wires equal in cross-section to the multiple-wire strands of my fabric that there can be almost no distortion of the metal in case of fire. This distortion in metal of considerable cross-section breaks up the concrete and is a frequent cause of disaster. I preferably use fine flexible wires of high-carbon steel, which may also be galvanized for additional security against rusting.

The fabric may be made in continuous long sheets, making possible a large monolithic area. The simplest, and I believe the most advantageous, application of the principle is in fabrics having two sets of strands arranged at right angles to each other; but obviously some or all of the advantages of the improvement may be obtained in fabrics whose strands are arranged in other ways.

A feature which is of especial value in concrete structures in lessening the weakening of the concrete by the bulky joints previously used consists in the scheme for holding the strands together at their crossing-point by interweaving the wires of one strand with those of the crossing strand. I have found by experiment that this interweaving makes a very firm joint, especially where the strands comprise an odd number of wires, permitting of very rough and rapid handling of the fabric without skewing or otherwise injuring the joints or deforming the fabric. I contemplate also other methods of joining the strands at their crossing-points as part of this invention, or I may combine with the interwoven joint additional binders, as hereinafter described.

It is especially when heavy or extra strong reinforcing is needed that the advantage of my present fabric over previous single-wire fabrics is observed. In single-wire fabrics the joint is extremely bulky and interferes with the making of a small and even roll of the fabric and also unnecessarily weakens the concrete. It is not feasible to make the spacing or binding wires of the fabric finer than the longitudinal wires, since such a combination produces an unbalanced joint.

It frequently happens in heavy fabrics of the old type that the finer binding-wire used is sprung loose under comparatively slight strain.

The accompanying drawings show numerous applications of the fabric and illustrate very well its applicability to concrete structures of many types.

The general arrangement of the concrete and the reinforcing fabric illustrated are taken from prior applications of myself and Fred E. Townsend.

Figure 2:
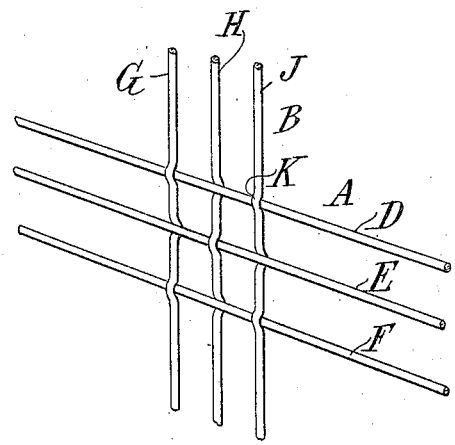
Figure 8:
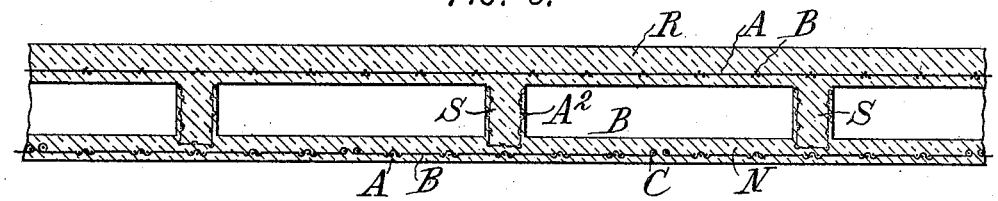
Figure 9:
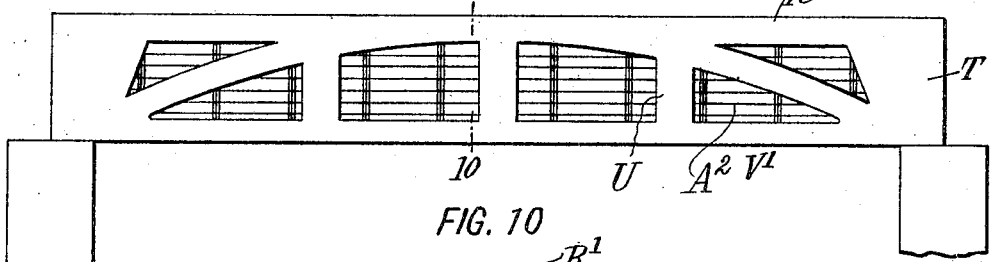
Figure 10:
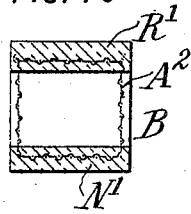
Figure 11:
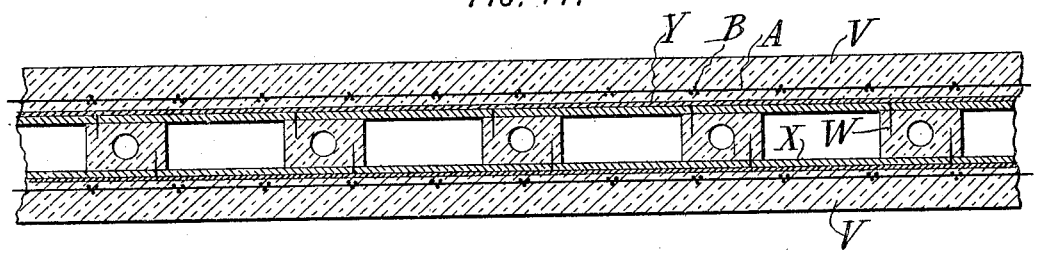
Figure 12:
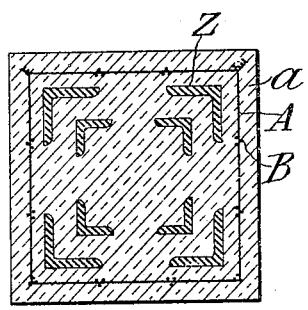

Figure 1 shows in plan view a sheet of my fabric arranged in a "bay" between two girders and two beams between the girders. Fig. 2 is a perspective view of a crossing joint of the fabric. Figs. 3, 4, 5, 6, and 7 are cross-sections of floor constructions transverse to the supporting I-beams. Fig. 8 is a cross-section of a floor structure transverse to the concrete beams employed. Figs. 9 and 10 are respectively a side elevation and a cross-section on the line 10 10 of a girder or beam. Fig. 11 is a horizontal section of a hollow wall or partition. Fig. 12 is a horizontal section of a column. Fig. 13 is a section of a reservoir-bottom or similar structure having an expansion-joint therein. Fig. 14 is a face view of a form of the fabric differing in specific construction from the form disclosed in the previous figures. Figs. 15, 16, and 17 illustrate different joints which may be used at the crossing-points of the fabric and also different numbers of wires in the strands of the fabric.

Referring now to the embodiments of the invention illustrated, Fig. 1 shows a fabric composed of strands A in one direction and strands B crossing the same at right angles, these strands being called, respectively, "longitudinal" and "transverse" for the sake of distinction. The strands forming the selvage, Fig. 13, may be of a single heavy wire C or of a bundle of wires C', the strands being preferably connected to the selvage by merely wrapping their ends around the selvage wire or wires. Each strand, referring to Figs. 1 and 2, comprises three wires D E F and G H J, respectively, spaced comparatively close together, having regard for the thickness of concrete needed between the individual wires, and the parallel strands A A or B B, or at least the strands of one of said sets, are separated by a comparatively great distance—that is, as compared with the space between the individual wires of the strands. For example, the wires of each strand may be spaced from four to ten times their diameter apart, and the size and shape of the mesh between the strands may vary greatly, depending upon the arrangement of the fabric in the concrete and the nature of the structure to be built, or it may vary in different parts of the same sheet.

I have found that a very firm joint may be obtained by interweaving the wires of the strands A with those of the strands B, preferably crimping the transverse wires G, H, and J, as at K, where they cross the longitudinal wires, so as to lock the latter positively against lateral movement. I may depend, however, on the mere frictional engagement without the crimps K, since I have found by experiments that this forms a very efficient joint. With either arrangement it will be observed that the longitudinal wires are straight, so that they may communicate strains directly from the load to the points of support without communicating any strain to the concrete and without any yielding by the wires.

Figure 3:
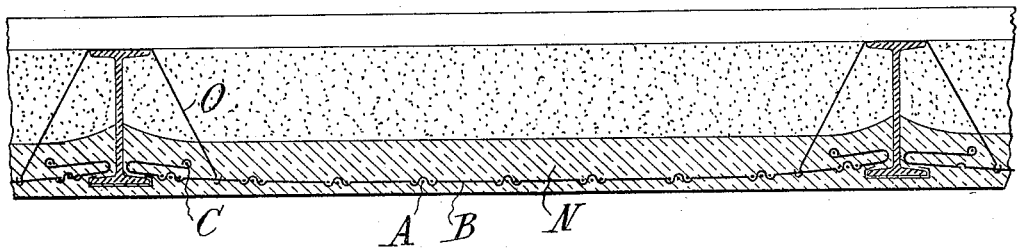

As taking advantage of the possibility of making and handling the fabric in large sheets, Fig. 1 shows girders L, between which are extended the usual smaller beams M, forming a long narrow bay, and the fabric is laid in this bay in a single long sheet of approximately the width of the bay, thus setting in place the entire area of fabric at once, upon which can then be laid at one operation the entire area of flooring. Fig. 3 is substantially a cross-section of Fig. 1 and shows the fabric laid on the lower flanges of the I-beams, with the longitudinal wires A extending longitudinally of the bay and the cross-wires B extending transversely thereof and with its selvage edges C bent back to form an additional shear reinforce adjacent to the I-beams, the whole being embedded in a ceiling-plate of concrete N. Wires O or similar hangers extend over the beams to give extra support to the portion of the fabric adjacent to the beams.

Figure 4:
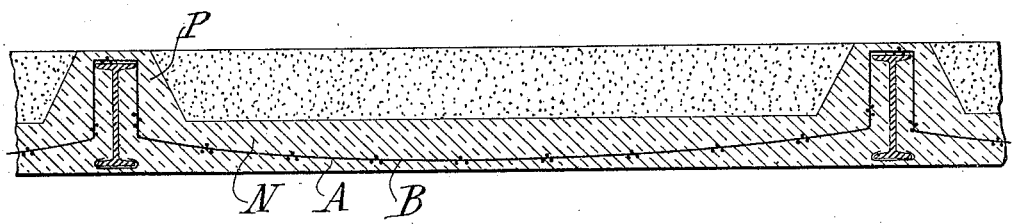

Fig. 4 shows a construction in which the fabric extends continuously over a number of beams, for which construction it is preferred to arrange the straight longitudinal wires A in the direction transverse to the beams and the transverse wires B longitudinally of the beams. In this, as well as in the other constructions described, the meshes of the fabric need not be square, as shown in Fig. 1, but are preferably dependent on circumstances. For example, if the longitudinal strands are required to carry a greater strain they will be made more numerous, and vice versa. The fabric in this case is depressed abruptly adjacent to the supports, and the bay is subsequently filled in with the ceiling-plate N and with upwardly-extending portions P, molded with a face approximately parallel with the fabric and completely inclosing and protecting the I-beams.

Figure 5:
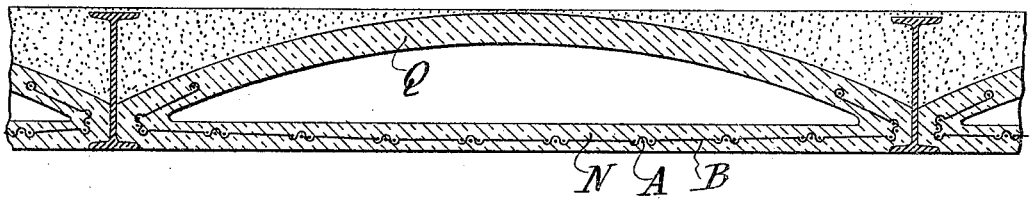
Figure 6:
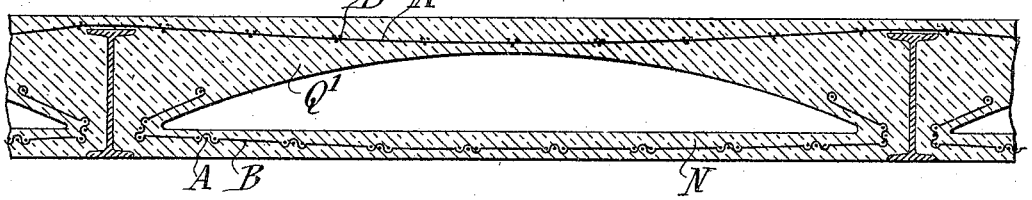

Fig. 5 illustrates the application of the fabric to a hollow floor. The fabric A B for convenience may be laid, as in Fig. 3, with the longitudinal wires A extending longitudinally of the bay. A ceiling-plate N envelops the main portion of the fabric. The latter is bent up at its ends, so as to extend into and be embedded in at least the end portions of an upper arched plate Q, so that the two plates N and Q, with the continuous reinforce transmitting the endwise strains on the upper plate to the fabric of the lower plate, form practically a self-contained truss, without horizontal strains on the supports. The bay may be filled with cinders on the haunches of the arched plate Q, or, as shown in Fig. 6, the upper plate Q' may fill the bay to or slightly above the tops of the I-beams and may be reinforced by a sheet of the fabric extending continuously over a number of beams, preferably with its longitudinal wires arranged transversely to the beams, thus giving the necessary relief to the haunches of the arch.

Figure 7:
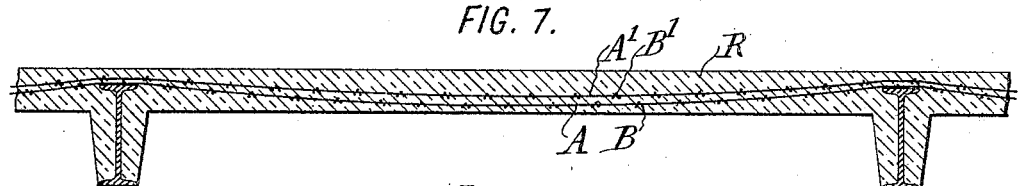

Fig. 7 shows a construction permitting of a floor of great strength and comparatively slight depth compared with the long spans for which it is adapted. The fabric in this case is arranged in two sheets A B and A' B', extending continuously over a number of beams and slightly depressed at the center, so as to lie in the lowest portion of the floor-plate R of concrete in which they are embedded. The use of two sheets of fabric, as shown, with the strands staggered relatively to each other, instead of one sheet of double-weight strands or of double the number of strands to a given area, strengthens the fabric without extra weakening of the cohesion of the concrete along the lines of the strands or along the surface in which the single fabric would lie. This construction, in effect, increases the number and reduces the size of the meshes and yet maintains the same strength of the concrete.

Fig. 8 illustrates a floor construction in which concrete beams S are used as substitutes for the ordinary steel I-beams, with their ends supported upon widely-spaced girders or other main supports. The floor-plate R of concrete is reinforced by a sheet of fabric extending throughout its lower portion and continuously over a number of the beams S, the longitudinal wires A being preferably run transversely of the supporting-beams S. The ceiling-plate N is preferably supported upon the main supports, which carry the ends of the beams S, and with such a construction the fabric reinforcing the ceiling-plate is preferably arranged with the longitudinal wires A running parallel with the beams S, and therefore transversely to the main supports. I have shown the concrete beams in this figure reinforced by a fabric embodying the broad invention herein claimed, but considerably modified from the form shown in the previous figure. This fabric is described hereinafter in detail in connection with Fig. 14.

Any of the floor constructions above described may be readily adapted to the making of beams supported only at their ends or similar structures by those skilled in the art. I illustrate in Figs. 9 and 10 a specific form of beam or girder including upper and lower plates or chords N' and R' and an arch Q between them, end posts T directly above the supports, and additional vertical members U at intermediate points between the arch and the lower chord. The whole is reinforced by a sheet or sheets of fabric of the form illustrated in connection with the beams S of Fig. 8 and hereinafter described in detail.

Fig. 11 illustrates an application of the fabric in the building of concrete walls, the wall shown comprising an outer shell of concrete V, with a core consisting of uprights W and plaster-board X, with a sheet of waterproof material Y immediately outside of the plaster-board core. The wire fabric is embedded in the concrete near its base, with the longitudinal wires A running either horizontally, as shown, which is more convenient in building the wall, or in any other direction. As far as the utilization of the fabric is concerned the wall might be formed with only one concrete face or of solid concrete or of any other internal construction than that illustrated.

The fabric is also useful in forming columns, an example of which is shown in Fig. 12. In the case illustrated a metal structure in the nature of a core is formed of a number of angle-irons Z, and the same is surrounded and the interspaces filled with concrete $a$, which stiffens the structure and its several parts against buckling strains and protects the metal from heat and consequent distortion. The fabric is arranged near the outer face of the concrete to most effectively prevent disintegration in case of fire and also to reinforce it against transverse strains. The fabric for this purpose is preferably of fine wires and large mesh, so that it retains but little heat and is subjected to very little warping strain. For convenience in building the column the longitudinal wires A of the fabric may be arranged horizontally; but it is within my invention to arrange them otherwise, as vertically or in a spiral running around and up the column.

The reservoir-floor illustrated in Fig. 13 comprises concrete plates $f$ with a wide joint between them, preferably filled with plastic asphalt composition $g$ or the like and with a plug $h$ in the upper face of the structure, which as the joint expands is pressed down to keep it closed. The fabric A B is laid in sheets extending continuously across the joint and bent or folded, as at $j$, to allow for expansion and contraction.

As previously stated, the number of wires in a strand and the spacing of the strands and the shape of the meshes may be considerably varied to meet the various conditions of building and using various types of concrete structures. A form of the invention differing considerably in appearance, but embodying the same generic principle as the previously-described constructions, is shown in Fig. 14. The transverse strands B in this case are composed of three separate wires G, H, and J, substantially the same as shown in Fig. 2, and, it may be, similarly spaced and crimped around the longitudinal strands. The complete transverse strands, however, are separated from each other by a considerable distance, preferably only sufficiently close to each other to preserve the spacing of the longitudinal strands. The longitudinal strands $A^2$, on the other hand, are composed each of a single wire and are placed comparatively close together. These are the only strands of the fabric which are designed for the taking of strain in the finished structure, and their spacing will depend on the amount of the strain, the width of space available for the entire fabric, and the strength of the wires, (which may be controlled by making them of greater or less diameter.) Preferably the longitudinal strands are made of such heavy wire as to avoid their being any closer together than the wires G H J of the transverse strands B. This fabric is peculiarly adapted for use in beams and is described and claimed in such connection in my application for patent for improvements in reinforced beams and the like and grillage therefor filed herewith. It is only as a specific example of the generic invention of this case that it is here illustrated. The application of it in beams is illustrated in Fig. 8, in which it extends through the lower portion and adjacent to the two side faces of the beams S, and in Fig. 10, in which it extends throughout the lower chord N′ and the upper chord R′ and also vertically along the two sides of the girder. Instead of the specific transverse strand B shown in this figure any other suitable transverse strand serving to maintain the spacing of the longitudinal strands may be used.

Fig. 15 illustrates a construction in which the crossing strands are held together not only by being interwoven, as in Fig. 2, and crimped, but by means of an additional binder $k$, extending diagonally over three wires D E F of the strand A and twisted at its ends around the outer wires G and J of the strand B. The binder might also be made to extend across the two diagonal lines of the joint, so as to hold all the wires of the joint firmly together. Such a binder, however, is of more use in connection with a fabric one or both of whose strands are made of fewer than three wires. For example, Fig. 16 shows a fabric of which the longitudinal strands A comprise two wires D E, and the transverse strands B likewise comprise only two wires G H. The wires of the two strands are interwoven, as shown; but for greater security a binder $l$ is used extending diagonally across one face of the joint and diagonally in the opposite direction across the other face of the joint, with its ends properly secured, as shown, or the fabric may comprise strands not formed of the same number of wires. For example, Fig. 17 shows a fabric of which the strand A comprises two wires D E and the transverse strand B comprises a single wire. Various styles of joint may be used for such a fabric. The figure shows the strand B crimped, as at K, around the wires of the longitudinal strand A, lying entirely on one side of all the wires of the strand A, a binder $m$ extending over the outer side of the wires D E and hooked at its ends around the wire B. A similar joint might be used for a fabric of the type shown in Fig. 14.

Though I have described with great particularity of detail certain embodiments of my invention and various applications thereof, yet it is to be understood that the invention is not limited to the specific embodiments or applications disclosed.

Various changes may be made in details and in the arrangement and combination of the parts by those skilled in the art without departure from the invention.

What I claim is—

1. A fireproof structure comprising in combination a concrete body and a wire fabric embedded therein, said fabric being composed of strands crossing each other and the set of strands in at least one direction being composed each of a plurality of wires which are comparatively close together and straight between the crossing-points, and the strands in at least one direction being separated by a comparatively great distance.

2. A fireproof structure comprising in combination a concrete body and a wire fabric embedded therein, said fabric being composed of strands crossing each other, each strand comprising a plurality of wires comparatively close together and the parallel strands being separated by a comparatively great distance.

3. A fireproof structure comprising in combination a concrete body and a wire fabric embedded therein, said fabric being composed of strands crossing each other, each strand comprising a plurality of wires comparatively close together and the parallel strands being separated by a comparatively great distance, and the wires of one strand being interwoven with those of the other at the crossing-points.

4. A fireproof structure comprising in combination a concrete body and a wire fabric embedded therein, said fabric being composed of strands crossing each other, each strand comprising a plurality of wires comparatively close together and the parallel strands being separated by a comparatively great distance, and binders binding the crossing strands together at their crossing-points.

5. A fireproof structure comprising in combination a concrete body and a wire fabric embedded therein, said fabric being composed of strands crossing each other, each strand comprising a plurality of wires comparatively close together and the parallel strands being separated by a comparatively great distance, the wires of one strand being crimped around those of the other at the crossing-points.

6. A fireproof structure comprising in combination a concrete body and a wire fabric embedded therein, said fabric being composed of strands crossing each other, each strand comprising a plurality of wires comparatively close together and the parallel strands being separated by a comparatively great distance, and the wires of one strand being interwoven with those of the other at the crossing-points, and binders binding the crossing strands together at their crossing-points.

7. A fireproof structure comprising in combination a concrete body and a wire fabric embedded therein, said fabric being composed of strands crossing each other, each strand comprising a plurality of wires comparatively close together and the parallel strands being separated by a comparatively great distance, the wires of one strand being interwoven with and crimped around those of the other at the crossing-points.

8. A fireproof structure comprising in combination a concrete body and a wire fabric embedded therein, said fabric being composed of strands crossing each other, each strand comprising a plurality of wires comparatively close together and the parallel strands being separated by a comparatively great distance, the wires of one strand being crimped around those of the other at the crossing-points, and binders binding the crossing strands together.

9. A fireproof structure comprising in combination a concrete body and a wire fabric embedded therein, said fabric being composed of strands crossing each other, each strand comprising a plurality of wires comparatively close together and the parallel strands being separated by a comparatively great distance, the wires of one strand being interwoven with and crimped around those of the other at the crossing-points, and binders binding the crossing strands at their crossing-points.

10. A fireproof structure comprising in combination a concrete body and a wire fabric embedded therein, said fabric being composed of strands crossing each other, the set of strands in at least one direction being composed each of an odd-numbered plurality of wires comparatively close together and the strands in at least one direction being separated by a comparatively great distance.

11. A fireproof structure comprising in combination a concrete body and a wire fabric embedded therein, said fabric being composed of strands crossing each other, each strand comprising a plurality of wires comparatively close together and straight between the crossing-points and the parallel strands being separated by a comparatively great distance.

12. A fireproof structure comprising in combination a concrete body and a wire fabric embedded therein, said fabric being formed in continuous sheets to facilitate the building of the structure and being composed of continuous longitudinal and transverse strands crossing each other at right angles, said strands in at least one direction being separated by a comparatively great distance and being each composed of a plurality of slender flexible wires (as distinguished from rigid rods or bars) arranged comparatively close together so as to obtain a reinforce of great tensile strength and at the same time reduce to a minimum the weakening of the concrete along the lines of the wires and the distortion of the metal under heat and to facilitate the manipulation of the fabric in use.

13. A fireproof structure comprising in combination a concrete body and a wire fabric embedded therein, said fabric being composed of strands crossing each other and the set of strands in at least one direction being composed each of a plurality of wires which are comparatively close together, and the strands in at least one direction being separated by a comparatively great distance, the wires of one set of strands being interwoven with those of the other set at the crossing-points.

14. A fireproof structure comprising in combination a concrete body and a wire fabric embedded therein, said fabric being composed of strands crossing each other and the set of strands in at least one direction being composed each of a plurality of wires which are comparatively close together, and the strands in at least one direction being separated by a comparatively great distance, the wires of one set of strands being crimped around those of the other set at the crossing-points.

15. A fireproof structure comprising in combination a concrete body and a wire fabric embedded therein, said fabric being composed of strands crossing each other and the set of strands in at least one direction being composed each of a plurality of wires which are comparatively close together, and the strands in at least one direction being separated by a comparatively great distance, and binders binding the crossing strands together at their crossing-points.

16. A floor or similar structure comprising in combination a concrete plate and a wire fabric embedded in the portion thereof subjected to tensile strain and extending to the supports thereof, said fabric being formed in continuous sheets and composed of strands crossing each other, the set of strands in at least one direction being composed each of a plurality of fine wires with comparatively narrow spaces between them sufficient to permit the passage of concrete therethrough, and the strands in at least one direction being separated by a comparatively great distance.

17. A fireproof structure comprising in combination a concrete body and two substantially parallel sheets of wire fabric embedded therein, said fabric being composed of strands crossing each other, the set of strands in at least one direction being composed each of a plurality of fine wires with comparatively narrow spaces between them sufficient to permit the passage of concrete therethrough, and the strands in at least one direction being separated by a comparatively great distance, and strands in one sheet of fabric being staggered relatively to the similar strands in the other.

18. A fireproof structure comprising in combination a concrete body and a wire fabric embedded therein, said fabric being composed of strands crossing each other at right angles, the set of strands in at least one direction being composed each of a plurality of wires which are comparatively close together and straight between the crossing-points, and the strands in at least one direction being separated by a comparatively great distance.

In witness whereof I have hereunto signed my name in the presence of two subscribing witnesses.

WILLIAM N. WIGHT.

Witnesses:
    DOMINGO A. USINA,
    FRED WHITE.